United States Patent [19]

Pichat

[11] Patent Number: 4,547,290

[45] Date of Patent: Oct. 15, 1985

[54] PROCESS FOR SOLIDIFICATION OF STRONGLY ACIDIC OR AKALINE LIQUID WASTES

[76] Inventor: Philippe Pichat, 18 rue des Tournelles, 75004 Paris, France

[21] Appl. No.: 606,991

[22] Filed: May 2, 1984

[30] Foreign Application Priority Data

May 3, 1983 [FR] France ................................ 83 07311

[51] Int. Cl.$^4$ .......................... C04B 1/00; C02F 11/14
[52] U.S. Cl. ..................................... 210/751; 210/919; 106/85
[58] Field of Search ................... 210/751, 919; 106/85

[56] References Cited

U.S. PATENT DOCUMENTS

| | | | |
|---|---|---|---|
| 2,679,537 | 5/1954 | Knowlton | 210/919 X |
| 3,694,356 | 9/1972 | Vander Horst | 210/919 X |
| 4,116,705 | 9/1978 | Chappell | 210/751 X |
| 4,149,968 | 4/1979 | Kopiec et al. | 210/751 X |
| 4,229,295 | 10/1980 | Krofchak | 210/751 X |
| 4,338,134 | 7/1982 | Münster | 106/8 S |
| 4,375,986 | 3/1983 | Pichat | 106/8 S |

FOREIGN PATENT DOCUMENTS 2466564 4/1981 France .

*Primary Examiner*—Thomas Wyse
*Attorney, Agent, or Firm*—Browdy and Neimark

[57] ABSTRACT

According to the process, a clay material is first dispersed with stirring in the waste (or vice versa) between 0° and 150° C. then, in particular in the case of acidic wastes, it is neutralized to an approximately neutral pH by a product preferably with a lime base and, in a third phase, a hydraulic and/or calcium binder is added to the mixture. Application to petrification of all types of wastes of industrial, mining, urban and other origins.

11 Claims, No Drawings

PROCESS FOR SOLIDIFICATION OF STRONGLY ACIDIC OR AKALINE LIQUID WASTES

This invention relates to the field of treatment of liquid wastes of various origins such as industrial, agricultural or municipal wastes. More particularly, it relates to a process making it possible to transform very acidic wastes, of a pH generally less than 2, or very basic and alkaline wastes, of a pH generally above 12, into solid materials having great stability in regard to external agents such as water and a great power for retaining polluting elements included in these wastes.

The danger to the environment and to living beings caused by wastes and residues of all types, is causing increasing concern. To solve this problem, various treatments have been recommended for these wastes, particularly by physical and chemical solidification, for example, by mixing muds or slurries of wastes with various ingredients such as cements, sodium silicate to which a setting agent has been added, gypsum or plaster, tars, metallurigical slags, etc.

More recently, an interesting petrification process has been proposed, which is especially applicable to very acidic aqueous wastes, consisting of first mixing the waste with coal fly ash, then neutralizing it to an approximately neutral pH and then adding a binder containing lime (French patent published under No. 2,466,564).

In this process, as in various other prior documents, it was suggested to use clay, among other additions. However, this clay is always used simultaneously with the addition of binder (lime, cement, etc.) and after the waste has been neutralized if it is not fairly neutral (see, for example, patents: German patent published under No. 2,930,602 and U.S. Pat. No. 4,149,968). Now, this technique has numerous drawbacks such as particularly: the difficulties of mixing the clay with the hydraulic binder, the need to use rather large amounts of neutralizing agent and the use, under quite poor conditions, of the physical and chemical characteristics of clay materials to fix the polluting elements of the wastes.

It has now been found and established that, in a surprising way, when clay is used directly, before any neutralizing and addition of hydraulic or calcium binder, in a very acidic or strongly alkaline aqueous waste, there occurs not a simple coating of the polluting elements but a series of phenomena of absorption, chemisorption, complexing and/or coprecipitation favorable to stabilization of polluting products. Further, it has been noted that, on the one hand, clays have a very high surface reactivity during this premixing, which favors the further reaction with lime or other binder and, on the other hand, the petrification times are notably lower and the mechanical properties of the solidified products are more favorable.

According to the invention, applicable to very acidic (pH$\leq$2) or very basic (pH$\geq$12) wastes, a clay material is dispersed in the waste (or vice versa) with stirring—in a first stage—at a temperature of 0° C. to 150° C., then, in particular in the case of acidic wastes, neutralization to a fairly neutral pH is performed, and then a hydraulic and/or calcium binder addition follows.

All types of fresh or dried clays can be used, such as pure clays (kaolinites, etc) or more generally mixtures belonging to the main mineralogical groups: montmorillonites, illites, smectites, chlorites, vermiculites, sepiolites, attapulgites, and which can contain various impurities such as hydroxides, metal carbonates, etc. It is particularly advantageous, on the cost level, to use various wastes of technical clays, quarry wastes and clay products from washing of materials.

Under the influence of the protons, in the case of acidic wastes, the surface of clay particles is increased during said first phase. There is formation of silica, $Fe^{3+}$, $Al^{3+}$, $Ca^{2+}$, $Mg^{2+}$ ions. The pH of the solution increases and the polluting elements of the wastes are fixed on the outside and inside surfaces of the clays and on the $Fe^{3+}$, $Al^{3+}$ etc., ions and their compounds, which are produced by surface attack of the clays.

In case the initial residues are strongly basic, the surface of the clay particles is increased under the influence particularly of the $OH^-$ ions because there is a formation in particular of soluble silicates and alkaline silicates. The pH of the solution has a tendency to go down and the polluting elements of the waste are fixed on the inside and outside surfaces of the clays.

The lengths and times of contact during the first clay/waste reaction phase are obviously variable depending on the type of raw material and according to the parameters of temperature, stirring speed, and amounts of materials. For example, the reaction is immediate when magnesium clays (sepiolite, attapalgite types) are used, whereas it is longer, for example several hours, for other clays or clay wastes.

In practice, this first stage is performed at standard temperature and pressure, for example, between 15° and 30° C. but it is possible to operate down to 0° C. and less or, on the contrary, accelerate the reaction by heating. The clay is dispersed in the waste (or vice versa in certain cases) preferably with vigorous stirring, for example, with a stirring system providing at least 1000 rpm to obtain a peripheral linear speed of the particles on the order of 10 to 15 meters/second.

According to the second stage of the process of the invention, the still acidic pasty mass is neutralized to the vicinity of neutrality. This neutralization can be performed with such products as lime (quick or slaked), ground limestone, calcium carbonate base wastes, calcium silicates and/or aluminates. This phase is accompanied by various precipitation and absorption reactions, taking into account the considerable specific surfaces developed.

Neutralization is not essential when the waste to be treated is of the strongly basic type. But it is advantageous in such a case to perform neutralization with an acidic waste or again a mixture of acidic waste and clay such as, for example, the one or ones mentioned above. Also, neutralization of the acidic wastes can also be performed with a mixture of basic waste and clay.

Finally, according to the third and last stage of the process, the pasty mass, optionally neutralized as indicated above, has added to it a hydraulic or calcium binder, with stirring. Of the products that can be used for this purpose, there can be cited in a nonlimiting way: quicklime, residues of production of quicklime or acetylene, natural hydraulic lime, Portland cement, blast-furnace and steel-furnace slags, fly ash from burning coal, lignite, garbage, plasters, etc. This addition does not cause a simple coating of the polluting elements but gives rise to the phenomena of absorption, chemisorption, complexing and coprecipitation favorable to stabilization of the polluting elements. This binder addition can be performed for example, among other means, by a plowshare type stirrer on the inside of a horizontal concrete mixer or again in a road type mixer operating continuously or intermittently.

In practice, the amounts of lime or lime donor used in the process are advantageously selected so that there is a ratio of clay/Ca $(OH)_2 \geqq 4$ and able to go up to 25.

Evacuation and transport of the treated waste are performed, for example, with a KOR 1 000 type piston pump which is fed by a booster mixer. Transport of the waste is preferably done during setting and before petrification; it is preferable that the setting mass be compacted or compressed before being put in the final disposal site.

The process according to the invention makes it possible to treat all types of liquid wastes whether strong acidic (often pH<2) or very basic and alkaline (pH>12) and of any origin: industrial, mining, urban and of an inorganic, organic or biological nature. They can contain various cations and/or anions or again organic compounds such as lipids, glucides, various hydrocarbons. Finally, the wastes to be treated can be radioactive.

The invention will be better understood from the detailed description of embodiments, cited in a non-limiting way, which relate to treatments of wastes of various compositions and sources.

ILLUSTRATIVE SAMPLES

In the following tests which correspond to compositions of wastes mentioned above, the effectiveness of the solidification treatment was evaluated by two types of tests: either statiic leaching, which simulates the action of a groundwater table, according to E. D. HARPE (IAEA, Atomic Energy Review, Vol. 9, No. 1, 1971); or the EPA dynamic test (US Federal Register, Dec. 18, 1978, part IV) consisting of stirring the solidified waste in water, possible correcting the pH and; then subjecting the leached products to analysis.

The tests were made, unless otherwise indicated, on samples 28 days old. Moreover, it will be noted that, in all cases, the compression strength of the samples corresponding to these examples was more than 3 megapascals (MPa)

EXAMPLE NO. 1

This example establishes the comparison between the known techniques of prior neutralization of the waste then addition of clay and hydraulic or calcium binder and the process according to the invention with the preliminary phase of reaction between the clay and waste.

Waste I was of the strongly acidic type (pH=0) and came from the surface treating industry (iron pickling). It was characterized by the following concentrations in cations and anions (in mg/1 $\times 10^3$):

Cu: 0.22
Fe: 0.9
Zn: 0.4
Cr: 0.35
Cd: 0.001
Ni: 0.5
Mn: 0.0005
$SO_4^{2-}$:165

(a) In a first test, 100 g of this waste I were neutralized with 33.8 g of CaO. Then, 26 g of a dry polychromatic clay and 3 g of calcium binder (CaO) were added to create pozzolanic bonds. The mixing period was five minutes. Solidification occurred in 4 days and, after leaching, the following results were obtained (in mg/l):

Cu: 0.75
Fe: 3.75
Zn: 0.12
Cd: 1.7
Ni: 0.75
Mn: 0.6

(b) This time 100 g of the same waste I were mixed directly in a concrete mixer with 20 g of dry polychromatic clay and allowed to react for 3 days. Then it was neutralized and it was found that 28 g of CaO sufficed for this operation. The binder was then added, with mixing, in 5 minutes (6 g of CaO) and solidification occurred in 3 days.

(c) In this test, a different use of dispersant was performed, this time 20 g of clay in 100 g of waste I with a Moritz turbine mixer going at 2000 rpm. Then, 27.5 g of CaO sufficed for neutralizing and then only 3 g of CaO were added as binder while mixing for five minutes. Analysis results were considerably improved after leaching:

Cu: 0.50
Fe: 3
Zn: 0.12
Cd: 1.4
Ni: 0.50
Mn: 0.50

(d) It was possible to improve these leaching results even more and reduce the amount of quicklime by somewhat increasing the proportion of clay until the limit for obtaining a homogeneous mixture was reached.

Actually, 26 g of polychromatic clay were dispersed in 100 g of waste I and it sufficed to add 25.7 g of CaO for neutralization. The subsequent binder consisted of 3 g of CaO. Leaching results are given below:

Cu: 0.25
Fe: 2.75
Zn: 0.12
Cd: 1.0
Ni: 0.50
Mn: 0.40

Further, it was found that twenty four hours after the tests, the samples of examples (b) (c) and (d) had solidified whereas the sample of example (a) had not. The sample of test (d) was the hardest (measurement with Vicat needle).

EXAMPLE NO. 2

Here a waste II coming from a stainless steel pickling shop was treated. A solution of hydrofluoric acid and nitric acid in a $H^+$ concentration of 1.39 mole was used.

(a) According to the prior known method, 100 g of waste II was neutralized with lime (11.5 g of CaO) then stirred with 180 g of vermiculite type clay containing quartz with a smaller cationic capacity than the previous polychromatic clay. It was then mixed for five minutes with 25 g of Portland cement. The compression strength after six says was 4 mPa (standard AFNOR P 15413).

(b) According to the process of the invention, 100 g of waste II was allowed to react for five hours with 180 g of the same clay. It was found, during neutralization, that 10 g of CaO were sufficient. The binder also consisted of 25 g of Portland cement, with a mixing period of five minutes. Compression strength then went to 5.8 mPa (instead of 4).

EXAMPLE No. 3

This time waste III coming from pickling of steel and having the following characteristics (in g/l) was treated:
Cu: 9.4
Fe: 81
Zn: 7.6
Cr: 1.6
Cd: 0.03
Ni: 0.63
pH: 0

100 g of this waste were treated with 11.7 g of a marl clay. A release of carbon dioxide gas occured immediately. It was found that neutralization occurred by itself. Then 30 g of Portland cement were added.

The following leaching results were obtained after 8 days (concentration in mg/l):
Cu: 0.2
Fe: 1.2
Zn: 0.3
Cr: 0.1
Cd: 0.3
Ni: 0.7
pH: 8

The results can be improved still more by the use of a larger amount of marl.

Solidification occurred in six days, despite the very slight proportion of marl added.

EXAMPLE NO. 4

Work was done on a waste IV coming from a fine chemistry shop and containing particularly such products as: sulfuric acid, dichloronitrobenzene. The pH was 0 and the COD (chemical oxygen demand) was 100,000 mg/l.

The operation was according to the process of the invention, using a sepiolite type clay which reacted in a few minutes and had a cation exchange capacity of 210. The binder consisted of lime. Two series of tests were made on the following amounts of products:

4.1 100 g of waste, 22 g of clay, 11 g of CaO
4.2 100 g of waste, 11 g of clay, 11 g of CaO The following leaching results were obtained after a week:

COD: 1,166 mg/l for test 4.1, 3,270 mg/l for test 4.2.

The sample corresponding to 4.1 had solidified in 6 days, whereas that corresponding to 4.2 solidified in 9 days.

EXAMPLE NO. 5

The same waste IV was treated by using as clay the marl of example 3 and by using slag or plaster as binder, with the following amounts of products:

100 g of waste + 22 g of clay + 13.3 g of CaO (neutralizing agent) + 22 g of ground slag (Blaine fineness 2,500)

100 g of waste + same constituents but 40 g of plaster (instead of slag)

After a week, leaching results, gave:

COD: 1,680 mg/l for first sample, 1,800 mg/l for second sample.

EXAMPLE NO. 5

This example shows the advantage, in some cases, of heating the clay dispersion in very acidic (or also very basic) waste.

Waste V discussed here was very acidic and came from a surface treatment shop. Its characteristics can be summarized as follows (amounts in mg/l):
Cu: 2.1
Zn: 2.6
Cd: 0.05
Ni: 1.1
Mn: 0.5
COD: 575
pH: 0

In the first type of treatment, 16 g of polychromatic clay was dispersed in 100 g of waste and then 9 g of CaO were needed to raise the pH to around 7. Then 25 g of Portland cement were added as binder.

In the second test, the clay and waste mixture was heated for 8 hours at 180° C. It then sufficed to use 8 g of CaO to reach the pH of 7. Then, as above, 25 g of Portland cement were added.

The IAEA leaching test, after 14 days, showed that there was practically no trace of the above cations, except for the first test (without heating) 0.05 mg/l of Zn (measurements made by atomic absorption).

EXAMPLE NO. 6

A very alkaline waste VI was treated which consisted essentially of soda for cleaning sheet metal in an automobile plant. The pH was 14, the COD: 50,000 mg/l, zinc concentration 187.5 mg/l, lead was 1.15 mg/l. and the phenol content was 70 mg/l.

40 g of gray clay (with a base of montmorillonite and chlorite) with a cation exchange capacity of 560 were added to 100 g of this waste. It was then brought to boiling for 15 minutes, then allowed to cool for an hour and then 30 g of ground slag and 10 g of plaster were added, then it was mixed for five minutes.

Leaching after 8 days showed that the COD exceeded 60, the OH ion concentration was 1 and the percentage of zinc had dropped to 0.1 (all these figures corresponding to mg/l).

EXAMPLE NO. 7

This example shows neutralization of a strongly basic waste after its reaction with a clay, with the aid of a suspension of clay in an acidic waste.

A basic waste VII, coming from a fine chemistry shop, with a pH of 12, containing 150 g/l of NaOH and exhibiting a COD of 80,000 mg/l, was used initially, 120 g of clay (with a base of chlorite, montmorillonite, quartz, illite), having a cation exchange capacity of 156, was dispersed in 100 g of waste with stirring at 1200 rpm.

Moreover, 120 g of the same clay was stirred under the same conditions in 100 g of an acidic waste VIII coming from an automobile production plant and having the following characteristics (concentration in mg/l):
Zn: 22
Cu: 50
Fe: 22 500
Ni: 1 800
Mn: 210
$NO_2-$: 2
COD: 3 000

183 g of this acidic waste-clay mixture were required to neutralize 100 g of the above mixture of basic waste and clay. The binder later used consisted of 9 g of lignite fly ash. Petrification took six hours.

After leaching, the following results were obtained:

Zn: 0.07
Cu: 0.35
Fe: 0.30
pH: 6
Ni: 1.20
Mn: 0.30
$NO_2$: <0.01
COD: 340

EXAMPLE NO. 8

This example is of the same type as the preceding one with different raw materials and conditions of use.

A mud waste IX coming from a waste treatment plant and exhibiting a pH of 13 was used initially. The concentrations (in $10^3$ mg/l) of the essential constituents were the following:
Fe: 175
Zn: 1.75
Cr: 35
Mn: 85
Ni: 27
Cd: 2.2
Cu: 95
COD: 75 000 mg/l 100 g of this waste were neutralized with 50 g of an acidic mixture prepared by dispersion of an acid waste X with a pH of 0 and polychromatic clay at 2000 rpm. The concentration of the essential elements in this waste were the following (in $10^3$ mg/l):
Fe: 81
Zn: 7.6
Cr: 1.6
Mn: 0.6
Ni: 0.6
Cd: $3.8 \times 10^{-3}$
Cu: 9,4

Then 25 g of Portland cement were used as hydraulic binder.

Analyses, after leaching of an 18-month-old sample, gave the following results:
Cu: 0
Fe: 0
Zn: 0
COD: 380
Cd: 0
Ni: 0
Mn: 0
pH: 7

(measurements made by atomic absorption)

EXAMPLE NO. 9

Here a series of tests were made intended particularly to vary the reaction times between the waste and clay.

The clay raw material was polychromatic clay and the acidic waste III of example 3 above was used, under the following conditions:

| Test No | 1st Phase | Period | Neutralization | 3rd Phase (binder) |
|---|---|---|---|---|
| 8.1 | 100 g waste + 22 g clay | 7 days | 14 g CaO | 25 g cement |
| 8.2 | 100 g waste + 22 g clay | 48 hours | 14 g CaO | 25 g cement |
| 8.3 | 100 g waste + 22 g clay | 48 hours | 14 g CaO | 15 g cement |
| 8.4 | 100 g waste + 22 g clay | 48 hours. | 14 g CaO | 10 g cement |

Portland cement was used.

After leaching, the following results were obtained (concentration in mg/l):

| SAMPLES | Cu | Fe | Zn | Pb | Cd | Ni | Mn |
|---|---|---|---|---|---|---|---|
| 8.1 | traces | 1 | 0.2 | — | 0.5 | 1 | 0.2 |
| 8.2 | 0.25 | 2 | 0.7 | — | 1 | 3 | 0.3 |
| 8.3 | 0.25 | 2.25 | 1.25 | — | 1 | 3 | 0.35 |
| 8.4 | 0.25 | 2.25 | 1.50 | — | 1 | 3 | 0.40 |

These tests show the advantage in letting the waste and clay react longer during the first operational phase according to the invention.

The results also show the importance of this first phase of fixing the waste on the clay and the flexibility of the process during the third, so-called solidification or petrification, phase. On the other hand, the petrification rate, of course, depends on the amount of binder used during this third phase and it clearly decreases in going from tests No. 8.2 to 8.4, sample 8.2 being the first to be solidified after only four days.

Various variants can, of course, be envisaged in the use of the process according to the invention. For example, in a nonlimiting way, it will be noted that neutralization of the strongly basic waste can be done with a mixture of acidic waste and coal fly ash as, for example, of the type according to French Pat. No. 2,466,564 already cited.

What is claimed is:

1. A process for the solidification of very acidic liquid wastes having a pH of less than or equal to about 2 or strongly basic liquid wastes having a pH of greater than or equal to about 12, into stable non-poluting solids which are resistant to leaching by water, consisting essentially of the steps of:
mixing the very acidic or strongly basic waste liquid with a clay material; and then
solidifying the mixture by adding hydraulic and/or calcium binder.

2. A process in accordance with claim 1, further including the step of, after said mixing step and prior to said solidifying step, neutralizing the mixture to approximately neutral pH.

3. A process in accordance with claim 2, wherein the waste liquid is very acidic, with a pH of less than or equal to about 2.

4. A process in accordance with claim 3, wherein said neutralizing step is accomplished by adding a mixture of basic waste material and clay.

5. A process in accordance with claim 2, wherein said neutralizing step is accomplished by the addition of an agent selected from the group consisting of quicklime, slacked lime, ground limestone, calcium carbonate base residues, calcium silicates and calcium aluminates.

6. A process in accordance with claim 2, wherein the waste liquid is strongly basic, with a pH of greater than or equal to about 12, and said neutralizing step is accomplished by adding acidic waste material or a mixture of acidic waste material with clay or coal fly ash.

7. A process in accordance with claim 1, wherein the waste liquid is strongly basic, with a pH of greater than or equal to about 12.

8. A process in accordance with claim 1, wherein said mixing step takes place at a temperature of about 0 to about 150° C.

9. A process in accordance with claim 1, wherein said clay material is selected from the group consisting of pure clay, a mixture of clays of the main mineralogical groups, technical clay wastes, wastes from quarries, wastes from the wash of clay sands, and mixtures thereof.

10. A process in accordance with claim 1, wherein the binder used in said solidifying step is selected from the group consisting of quicklime, slacked lime, Portland cement, blast-furnace slag, slag cement, coal or lignite fly ash and plaster.

11. A process in accordance with claim 10, wherein the amount of calcium binder added is such that there is a ratio of clay to $Ca(OH)_2$ of about 4 to about 25.

* * * * *